March 21, 1961 G. F. McGOWAN 2,975,479
FLASK FOR MAKING DENTURES
Filed March 12, 1956
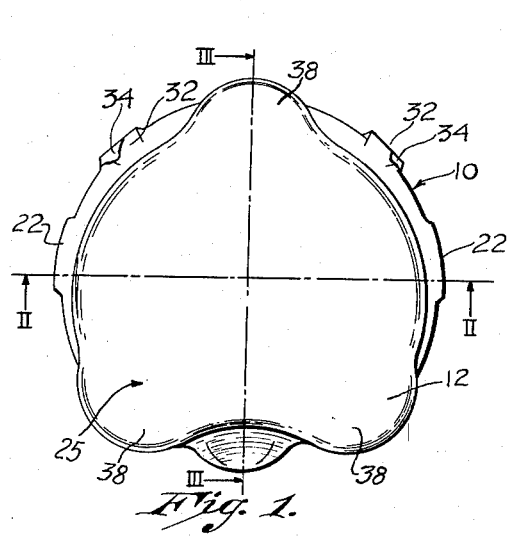
Fig. 1.
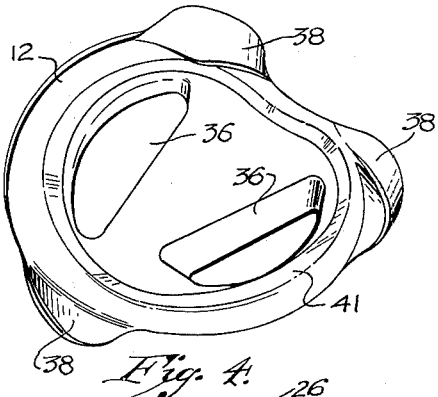
Fig. 4.
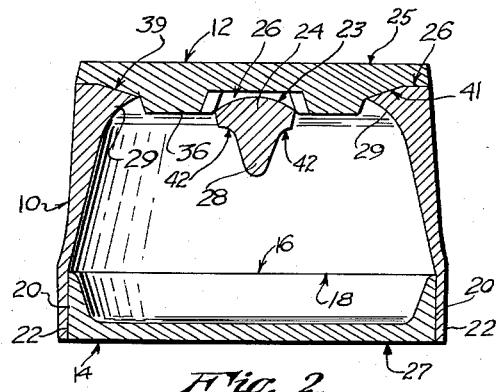
Fig. 2.
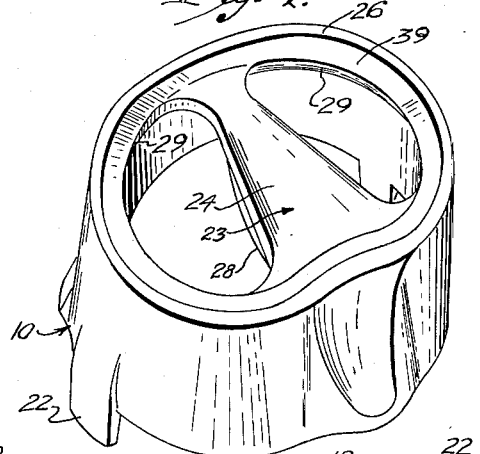
Fig. 5.
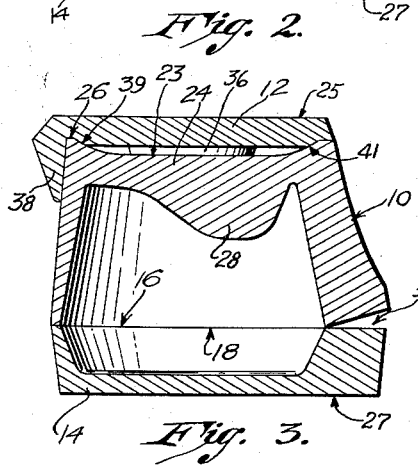
Fig. 3.
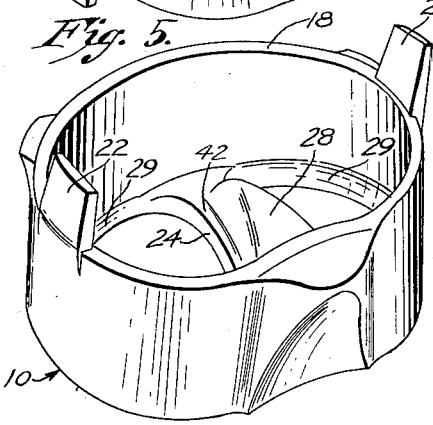
Fig. 6.
INVENTOR.
George F. McGowan
BY 
ATTORNEY United States Patent Office 2,975,479
Patented Mar. 21, 1961

2,975,479

FLASK FOR MAKING DENTURES

George F. McGowan, 4509 Forest Ave., Kansas City, Mo.

Filed Mar. 12, 1956, Ser. No. 570,842

2 Claims. (Cl. 18—33)

This invention relates to prosthetic dentistry, and more particularly to reline and new denture techniques, the primary object being to improve upon the dental flask forming the subject matter of my copending application Serial No. 555,414, filed December 27, 1955, this being a continuation in part of said application.

It is the most important object of the present invention to provide an improved dental flask much in the nature of that disclosed in my copending application aforementioned and having all of the novel features and important advantages thereof, but including additionally means in the nature of a boss of heat conductible material and forming an integral part of a bridge formed in the flask section for more evenly distributing the curing temperature than has been made possible by structures heretofore suggested in this art.

Another important object of the instant invention is to provide a dental flask that improves upon the disclosure of my copending application by virtue of the provision of opposed overhanging lips cooperable with the bridge and the heat conducting boss aforementioned, for the purpose of providing a better retention of the investment material within the flask section.

It is a further object of the instant invention to provide a dental flask having novel means of transmitting pressure through the medium of shelf-like surfaces surrounding the heat conducting boss and facing inwardly toward the investment material normally used in the flask section for manufacturing dental fixtures.

Other objects include the way in which the aforementioned novel features of the instant invention cooperate with the structural components shown and described in my copending application to make it possible to produce a well-fitting appliance conforming accurately to the positive model upon which it is made.

In the drawing:

Figure 1 is a plan view of a dental flask made according to my present invention.

Fig. 2 is a cross-sectional view taken on line II—II of Fig. 1.

Fig. 3 is a cross-sectional view taken on line III—III of Fig. 1.

Fig. 4 is a perspective view showing the innermost face of an ejector to be used with the flask in the manner illustrated by Figs. 1 to 3 inclusive.

Fig. 5 is a perspective view of the tubular section of the flask; and

Fig. 6 is a perspective view of the section shown in Fig. 5 and illustrating the interior configuration thereof.

While the flask illustrated in the drawing is composed of a primary intermediate section 10, and a pair of end sections 12 and 14, the invention contemplates essentially the provision of a two-section dental flask as distinguished from conventional devices of this character wherein it has heretofore always been deemed necessary to close both ends of the section 10 during use thereof in producing artificial appliances for the mouth. Accordingly the section 12 is essentially an ejector to be used in the manner hereinafter to be more fully described.

Those skilled in this art are familiar with the steps commonly employed in the manufacture of artificial dental appliances and while the principles of the instant invention are intended to be limited to reline and new denture techniques, it is understood that such principles apply equally well to the production of partial dentures and other types of artificial restoration.

Accordingly, in the usual manner, a negative impression of the user's mouth will be taken and from which is produced a positive model, pattern or cast. Normally, a suitable composition is employed in the shaping of a base plate over the model, whereupon artificial teeth are mounted on such base plate following which the dentist will normally adjust the teeth within the base plate by a trial fit in the mouth of the user.

Thereupon, the permanent denture is produced by use of the dental flask shown in the drawings. The aforementioned base plate is thereupon attached to the model through use of a removable substance, such as wax, and the cast is invested within a suitable casting or molding material. Such initial casting operation is carried out with flask section 14 and to this end, the latter is in the nature of a relatively shallow flat plate adapted to close the larger open end of frusto-conical primary flask section 10.

Section 14 is provided with a continuous, relatively narrow flat edge 16 that bears directly against a similar edge 18 at the larger open end of section 10 in abutting relationship thereto. When sections 10 and 14 are so relatively disposed, opposed notches 20 in the section 14 are received by corresponding downturned ears 22 integral with the section 10.

After the investment receiving the positive model has hardened, the attached base plate, together with the artificial teeth mounted thereon, are invested with a molding or investment material within the flask section 10, it being seen that such investment material may be easily poured into the section 10 through the smaller open end thereof while the sections 10 and 14 are together. Before pouring molded investment into section 10, a suitable separating medium is applied to the hardened investment surface exposed in section 14, so as to facilitate the separation of sections 10 and 14 during further processing.

In accordance with the principles of the instant invention, it is to be preferred that the level of such investment material be coincident with the outermost face 23 of a substantially triangular bridge 24 spanning the distance across section 10 therewithin and substantially diametrically thereof adjacent the smaller of the two open ends of section 10. It is to be particularly noted that the face 23 of bridge 24 is spaced inwardly from outermost flat continuous edge 26 of section 10, which edge 26, incidentally, is not only parallel with the edges 16 and 18, but parallel with the outermost faces 25 and 27 of closure sections 12 and 14 respectively when the latter are mounted on the intermediate section 10. The ultimate removing of the investment from the section 10 is facilitated not only by the frusto-conical interior configuration of section 10, but by the substantially triangular, cross-sectional contour of a heat conductor 28 in the nature of a boss formed integrally with the bridge 24 and extending inwardly therefrom. The elongated substantially elliptically shaped boss 28 is made from suitable heat conducting material and terminates at the ends thereof in spaced relationship to the inner face of the section 10.

Following the hardening of the investment within the section 10, the two sections 10 and 14 are separated and the wax forming the base plate is removed, leaving the model in its initial condition invested within section 14 and leaving the teeth firmly embedded within the investment contained by section 10. The investment in section 10 is thereupon normally coated with a conventional separating medium to facilitate removal of the completed denture, following which the same is packed with a polymeric denture base material covering that portion of the exposed teeth, together with any indentions, sockets and metal pins embedded so as to secure their permanent attachment to the finished denture whereupon, the flask sections 10 and 14 are reassembled and compressed tightly together in any suitable manner so as to cause the denture base material to distribute evenly over the cast and conform to the configuration thereof during polymerization.

A conventional press may be utilized for such purpose, having a base receiving the edge 26 of the section 10 and a ram, for example, that bears against the outermost face 27 of section 14. It is during this stage of the technique that the novel construction of the flask illustrated in the drawing, becomes most important. By virtue of the fact that the investment within the section 10 is spaced from the edge 26, the pressure that is exerted in the press to hold the sections 10 and 14 together, is not exerted upon the investment. By the same token, however, the bridge 24, together with the boss 28, and the frusto-conical configuration of the section 10, prevent undue movement of the investment, forcing the denture base material to set in accordance with the configuration of the pattern and in precise shape and thickness to the base plate previously removed. Such results are attained further by virtue of the provision of a pair of opposed arcuate overlapping lips 29 separated by bridge 24 and formed integrally with the section 10 therewithin adjacent the smaller end of the section 10.

After hardening of the denture base material, the section 14 is pried loose from the section 10 by insertion of a suitable wedging implement within a notch 30 formed between the sections 10 and 14. A number of protuberances 32 and 34 are provided on sections 10 and 14 respectively to further facilitate the prying apart of these two flask sections.

The investment within the section 10 may be removed in any suitable manner, but to facilitate such operation, flask section 12 is provided with a plurality of extensions or protuberances 36 on one face thereof having thicknesses greater than the distance between the inner face of section 12 and the outer faces of bridge 24 when the section 12 is assembled on the section 10 in the manner illustrated by Figs. 2 and 3 of the drawing. Consequently, by virtue of the fact that section 10 has been removed and its refuse investment content, including the impression model, eliminated, and the section 14 replaced in its correct relation to section 10, it is but necessary to apply pressure to the outer face 26 of section 12 to force the protuberances 36 against the investment and thereby, force the latter outwardly through the larger open end of section 10 into the empty receptacle section 14 sufficiently so as to dislodge the investment from the section 10.

Figures 2 and 3 of the drawing illustrate the way in which the protuberances 36 are spaced to clear the bridge 24 during such investment removal step. It is to be noted that section 12 is provided with a plurality of wings 38 that embrace the section 10 and thereby hold the section 12 in proper relationship to the section 10 during the removal of the investment. The section 10 is provided with an inwardly beveled continuous edge 39 merging with the flat edge 26 thereof, and the section 12 is accordingly provided with a beveled edge 41 complemental with the edge 39.

It is seen from the foregoing, therefore, that the dental flask is essentially a two-section flask since the section 12 is not essential to the steps of producing the appliance and it is contemplated that section 12 will only be used for investment removal purposes as just above described.

When the flask is placed in use the boss 28 conducts heat into the center of the flask for a more even distribution of the curing temperature. The boss 28, which forms a part of the bridge 24, serves as a partial closure for the open end of the flask and contributes to the elimination of any need for a lid.

The definite and pronounced curvature of the inner walls of the flask section 10 by virtue of the provision of the arcuate overhanging portions 29—29 provides for a better retention of the investment material and helps to effect a further closure of the open end of the flask. Indentations or shelf-like, inwardly facing surfaces 42 on each side of the conductor or boss 28 provide for better retention of the investment material without pressure being transmitted to the latter.

From the foregoing it is to be appreciated that one of the features of the invention includes the elimination of pressure upon the investment during setting, hardening or curing of the denture material, since in conventional structures such pressure upon the investment itself oftentimes results in improper fit. Associated with such important feature of the invention is the heat conducting portion 24—28 of the flask and forming an integral part thereof.

Having thus described the invention what is claimed as new and desired to be secured by Letters Patent is:

1. In a dental flask, a substantially tubular section having a pair of opposed, open ends; investment-retaining bridge means secured to the tubular section therewithin diametrically across the smaller of said ends inwardly of the latter; and an inwardly-extending elongated heat conductor having a substantially triangular vertical cross section and extending inwardly a substantial distance within said tubular section and rigidly secured to said bridge means.

2. In a dental flask, a substantially tubular section having a pair of opposed, open ends; investment-retaining bridge means secured to the tubular section therewithin diametrically across the smaller of said ends inwardly of the latter; an inwardly-extending elongated boss having a substantially triangular vertical cross section, said boss composed of heat conducting material integral with said bridge means and extending inwardly a substantial distance within the tubular section and inwardly facing pressure transmitting surfaces around said boss.

References Cited in the file of this patent

UNITED STATES PATENTS

| | | |
|---|---|---|
| 1,447,666 | Jencks et al. | Mar. 6, 1923 |
| 1,500,155 | Romine et al. | July 8, 1924 |
| 2,117,086 | Feminella | May 10, 1938 |
| 2,245,849 | Ballard | June 17, 1941 |
| 2,316,631 | Schwartz | Apr. 13, 1943 |
| 2,421,698 | Hordes | June 3, 1947 |